United States Patent
Svoboda et al.

(10) Patent No.: US 7,972,997 B2
(45) Date of Patent: *Jul. 5, 2011

(54) PROCESS FOR COATING GRAVEL PACK SAND WITH POLYMERIC BREAKER

(75) Inventors: Charles Svoboda, Katy, TX (US); Hugh Caffery, Lockport, LA (US); Li-Jein Lee, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 810 days.

This patent is subject to a terminal disclaimer.

(21) Appl. No.: 11/424,194

(22) Filed: Jun. 14, 2006

(65) Prior Publication Data

US 2007/0054054 A1 Mar. 8, 2007

Related U.S. Application Data (60) Continuation of application No. 10/858,610, filed on Jun. 1, 2004, now Pat. No. 7,132,389, which is a division of application No. 10/065,141, filed on Sep. 20, 2002, now Pat. No. 6,817,414.

(51) Int. Cl.
*E21B 43/267* (2006.01)
*C09K 8/80* (2006.01)

(52) U.S. Cl. ........ 507/260; 507/219; 507/261; 507/265; 507/267; 507/269

(58) Field of Classification Search ............... None
See application file for complete search history.

(56) References Cited

U.S. PATENT DOCUMENTS

| | | | |
|---|---|---|---|
| 3,468,853 A | 9/1969 | Schmitt et al. | |
| 3,875,937 A | 4/1975 | Schmitt et al. | |
| 3,924,047 A * | 12/1975 | Ward et al. | 428/378 |
| 4,272,398 A | 6/1981 | Jaffe | |
| 4,330,459 A * | 5/1982 | Takahashi et al. | 523/148 |
| 4,797,216 A * | 1/1989 | Hodge | 507/244 |
| 4,852,629 A * | 8/1989 | Fechter et al. | 164/16 |
| 4,986,354 A | 1/1991 | Cantu et al. | |
| 5,075,115 A | 12/1991 | Brine | |
| 5,520,250 A | 5/1996 | Harry et al. | |
| 5,654,009 A * | 8/1997 | Hata et al. | 424/490 |
| 6,150,497 A | 11/2000 | Sastry et al. | |
| 6,257,335 B1 * | 7/2001 | Nguyen et al. | 166/280.2 |
| 6,737,386 B1 * | 5/2004 | Moorhouse et al. | 507/211 |

(Continued)

FOREIGN PATENT DOCUMENTS

WO    WO 9822240 A1 *  5/1998

(Continued)

OTHER PUBLICATIONS

PCT International Search Report issued in PCT Application No. PCT/US2007/071246 dated Nov. 23, 2007 (3 pages).

(Continued)

*Primary Examiner* — John J Figueroa
(74) *Attorney, Agent, or Firm* — Osha • Liang LLP (57) ABSTRACT

A process for making a coated substrate that includes treating a proppant with a coating agent, wherein the coating agent comprises at least one of monomeric alpha-hydroxycarboxylic acids, alpha-hydroxycarboxylic acid polymers, and combinations thereof, reacting the treated proppant to form a polymer coated proppant, and recovering the polymer coated proppant is disclosed.

14 Claims, 3 Drawing Sheets

U.S. PATENT DOCUMENTS

| | | | |
|---|---|---|---|
| 6,817,414 B2 | 11/2004 | Lee | |
| 6,869,445 B1 * | 3/2005 | Johnson | 623/17.11 |
| 2004/0094300 A1 * | 5/2004 | Sullivan et al. | 166/308.1 |

FOREIGN PATENT DOCUMENTS

| | | | |
|---|---|---|---|
| WO | 9930855 A1 | | 6/1999 |
| WO | WO 9930855 A1 * | | 6/1999 |

OTHER PUBLICATIONS

PCT Written Opinion issued in PCT Application No. PCT/US2007/071246 dated Nov. 23, 2007 (3 pages).

Office Action issued in Canadian Application No. 2,654,871 dated Jun. 14, 2010 (3 pages).

* cited by examiner

PROCESS FOR COATING GRAVEL PACK SAND WITH POLYMERIC BREAKER

CROSS-REFERENCE TO RELATED APPLICATION

This application is a continuation-in-part of U.S. application Ser. No. 10/858,610, currently pending, which is a divisional of U.S. application Ser. No. 10/065,141, now U.S. Pat. No. 6,817,414.

BACKGROUND

1. Field of the Invention

Embodiments disclosed herein relate generally to materials used to break a filter cake. In particular, embodiments disclosed herein relate to the manufacture and use of gravel pack sand coated with a polymerized alpha-hydroxycarboxylic acid such as polyglycolic acid.

2. Background

To produce oil and gas from hydrocarbon reservoir, a borehole of tapered and oftentimes deviated geometry is first drilled through geological formations. The hydrocarbon-bearing formation is then drilled with a specially designed reservoir drilling fluid having various additives, such as starches and calcium carbonate, which are soluble or breakable by acid, oxidizers, or enzymes, or a combination of these chemicals.

Once the desired borehole in the hydrocarbon reservoir is drilled, production tubes and/or screens are run to the bottom of the borehole and placed against the desired formations for hydrocarbon production. When the hydrocarbon-bearing formations consist of poorly cemented sands, sand control methods or devices are used to prevent sand particles in the formation from entering and plugging the production screens and tubes in order extend the life of the well.

One of the typical sand control methods is to fill the annular space between the wellbore and the production screens with specially sized sand, which is usually larger than the formation sand and commonly known as gravel pack sand. The process to place the sized sand behind the production screen is known as a gravel pack operation.

In order to be able to fill the annular space with sand completely and successfully, the hydrocarbon-bearing formation should have been previously covered with a thin layer of firm and substantially impermeable filter cake formed by the reservoir drilling fluid. This thin and impermeable filter cake may prevent the gravel pack fluid from entering the formation, and may result in gravel pack failure.

After the gravel pack sand has been successfully placed, the filter cake existing between the gravel pack sand and the formation needs to be removed before the flow of hydrocarbon is initiated. Without the removal of the filter cake, plugging of the production screen by the filter cake could occur, impairing production.

Various chemicals, breakers and mechanical devices have been developed and used to destroy a filter cake that is behind the gravel pack sand. For example, hydrochloric acid is often delivered by a separate operation to soak the gavel pack sand and filter cake with the aid of wash cups. The mechanical wash cups attached to the end of a work string must be picked up at the surface and lowered to the bottom through the inside of the screen. The hydrochloric acid is then pumped through the gravel pack sand repeatedly. The goal of this exercise is to destroy a large amount of the acid-soluble and acid-breakable components in the filter cake.

Other breakers, such as oxidizers and enzymes, may also be delivered to destroy oxidizer- and enzyme-breakable organic components, such as starch polymers. However, these breakers are considered less efficient in several ways. First, they are not effective in destroying acid-soluble and acid-breakable inorganic components in the filter cake, such as calcium carbonate. As a result, acid-soluble and breakable components will remain behind the gravel pack sand and may subsequently cause impairment during the production of the well. Second, many oxidizing breakers have compatibility issues with certain brines. They may react with the brine and create undesirable by-products, such as $Cl_2$ and $Br_2$ gases. This reaction can occur even before the breakers are pumped down to attack the filter cake. Third, in addition to brine compatibility issues, enzyme breakers also have a temperature issue. Most enzyme breakers will lose reactivity in highly concentrated divalent brines or at temperatures above 93° C. (200° F.).

The above breakers are normally pumped on a separate trip after the gravel pack sand has been set. They are not pumped during the gravel pack operation because they can create precarious conditions for the operation. For instance, the acid-based breakers can destroy the filter cake during gravel pack operation, and consequently result in high fluid loss and premature failure in the gravel pack operation.

Pumping oxidizers and enzyme breakers with gravel pack sand may cause inconsistent application of oxidizers and enzyme breakers to the filter cakes. Oxidizers may work quickly compromising the filter cake integrity. In addition, the concentration and distribution of these breakers in the gravel pack sand is likely to be erratic, making the filter cake removal less effective.

Microencapsulation is one technique used to deliver wellbore chemicals downhole. The microencapsulation process and application of microencapsulated oil field chemicals, such as scale inhibitors, corrosion inhibitors, surfactants, bactericides, paraffin dispersants, pourpoint modifiers, cement additives, fracture fluid cross linkers, emulsion breaking chemicals, chemical tracers, radioactive tracers, and asphaltene treatment chemicals, using condensation product of hydroxyacetic were disclosed in U.S. Pat. No. 4,986,354. The encapsulated special chemicals are injected along with water into oil wells. Disintegration of the encapsulating polyglycolic polymer in the presence of water allows the encapsulated chemicals to be released to achieve desired reactions.

Microencapsulation of pesticides, insect growth regulators, and other organic compounds in biodegradable polymers from the group consisting of polylactic acid and copolymers of lactic and glycolic acids was disclosed in U.S. Pat. No. 4,272,398.

There exists an on-going need and desire for breakers which provide a slow release mechanism to initiate the disintegration of filter cakes so that gravel pack operations can be continued. Additionally, there exists a need for efficient methods to manufacture these breakers.

SUMMARY

In one aspect, embodiments disclosed herein relate to a process for making a coated substrate that includes treating a proppant with a coating agent, wherein the coating agent comprises at least one of monomeric alpha-hydroxycarboxylic acids, alpha-hydroxycarboxylic acid polymers, and combinations thereof, reacting the treated proppant to form a polymer coated proppant, and recovering the polymer coated proppant.

In another aspect, embodiments disclosed herein relate to a process for making a coated substrate that includes heating a proppant to a temperature sufficient to react a monomeric alpha-hydroxycarboxylic acid, applying a monomeric alpha-hydroxycarboxylic acid solution onto the proppant to form a polymer coated proppant, and recovering the polymer coated proppant.

Other aspects and advantages of the invention will be apparent from the following description and the appended claims.

DETAILED DESCRIPTION

In one aspect, embodiments disclosed herein relate to a relatively dense breaker that can be used as gravel pack sand and placed evenly across an impermeable filter cake deposited by a reservoir drilling fluid using a conventional gravel pack operation. In another aspect, embodiments disclosed herein relate to a method to manufacture the dense breaker.

Under downhole conditions, the breaker product may slowly release an acidic byproduct to dissolve or break down acid-soluble and acid-breakable components in the filter cake. The invention involves the coating of a proppant, such as sized, industrial grade gravel pack sand, with a polymerized alpha-hydroxycarboxylic acid. It should be noted that the polymerized alpha-hydroxycarboxylic-acid-coated proppant may be mixed with a quantity of uncoated proppant, such as mixing conventional gravel pack sand and polyglycolic-acid-coated sand. The breaker-coated sand can be used as gravel pack sand and can be evenly distributed over the filter cake.

The alpha-hydroxy acid monomers can be polymerized into polymeric forms by condensation polymerization. In one embodiment, self-polymerization can be initiated by heating the monomer to a temperature above the melting point of the polymeric form. The polymeric form of alpha-hydroxy acids, once formed and re-dispersed in water, can slowly hydrolyze and release an acidic by-product. The rate of hydrolysis is affected by temperature. Alpha-hydroxy acids useful in embodiments disclosed herein include malic, lactic, gluconic, glyolic, citric, mandelic, saccharic, mucic, tartaric and mixtures thereof.

Polyglycolic acid polymers are known in the art and described in U.S. Pat. Nos. 3,468,853 and 3,875,937. The polymeric form of alpha-hydroxy acids made from a condensation process has been used in the medical industries for manufacturing of biodegradable medical articles such as sutures, capsules, etc. A method for production of polyglycolic acid to make medical articles is disclosed in U.S. Pat. No. 6,150,497.

The molecular weight of the alpha-hydroxycarboxylic acid polymers may affect binding or adhesion of the polymer on the proppant, both initially and at down hole conditions (typically a higher temperature). Additionally, molecular weight may affect the hydrolization rates and formation of acid downhole, possibly affecting the rate and effectiveness of the polymer coated proppant in breaking the filter cake.

In some embodiments the weight average molecular weight of the alpha-hydroxycarboxylic acid polymer may range from 500 to 10,000,000 atomic mass units. In other embodiments, the weight average molecular weight may range from 1,000 to 500,000 atomic mass units; and from 2,000 to 200,000 in yet other embodiments. In some embodiments, the molecular weight distribution ($M_w/M_n$) of the alpha-hydroxycarboxylic acid polymer may range from 1.2 to 5.0. In other embodiments, the molecular weight distribution may range from 2.0 to 4.0; and from 2.3 to 3.5 in yet other embodiments.

In some embodiments, proppants may include any particulate substrate useful for gravel packing. Examples of suitable substrates include natural and synthetic silica sand, glass beads, quartz, ceramics, thermoplastic resin, sintered bauxite, metal oxides, and mixtures thereof. In some embodiments, the substrates are porous.

Embodiments of methods for coating a proppant with a poly(alpha-hydroxycarboxylic acid), such as polyglycolic acid, include dry methods and wet methods. In general, the dry method begins with the polymer as a feed material. The wet methods may include monomeric or polymeric solutions as a feed material. Processes to coat the proppant with polymer (from a polymeric or monomeric feedstock) may include fluidized bed drying, mixing followed by screen drying, rotary drum drying, coating machines, and agglomerative granulation. In certain embodiments of the processes, the monomer or a polymeric solution may be sprayed onto the proppant. In some embodiments, a binder may be used to facilitate adhesion of the polymer to the proppant. In other embodiments, a partitioning agent may be used to prevent agglomeration of the proppant particles. A few of these methods are described below.

In one embodiment, a process for making a coated substrate may include the general steps of: treating a proppant with a coating agent, wherein the coating agent comprises at least one of monomeric alpha-hydroxycarboxylic acids, alpha-hydroxycarboxylic acid polymers, and combinations thereof, reacting the treated proppant to form a polymer coated proppant; and recovering the polymer coated proppant.

The reacting may include polymerizing at least a portion of the monomeric alpha-hydroxycarboxylic acids, heating the treated proppant above a melting temperature of at least one of the alpha-hydroxycarboxylic acid polymers, or combinations thereof. Reacting the treated proppant may bind a polymeric alpha-hydroxycarboxylic acid to the proppant.

In some embodiments, the coating agent may include a solvent. Suitable solvents may include water and organic solvents such as methylene chloride, for example. Where the coating agent includes a solvent, the reacting step may include removing the solvent from the treated proppant to bind the polymer to the proppant.

In other embodiments, the treating may include applying the coating agent onto the proppant. In some embodiments, the coating agent may be a molten alpha-hydroxycarboxylic acid polymer.

In other embodiments, unassociated polymer (polymer not bound to a proppant) may form during the reacting step. Unassociated polymer may be recovered and recycled to the treating step if desired.

In other embodiments, agglomerates (two or more coated proppant particles physically bound together) may form during the reacting step. The process may also include separating agglomerates from the polymer coated proppant mixture; deagglomerating the agglomerates to form polymer coated proppant particles; and recycling the particles to the recovering step.

In other embodiments, a process for making a coated substrate may include: heating a proppant to a temperature sufficient to react a monomeric alpha-hydroxycarboxylic acid; applying a monomeric alpha-hydroxycarboxylic acid solution onto the proppant to form a polymer coated proppant; and recovering the polymer coated proppant.

Both wet and dry methods may employ an indirectly-heated thermal desorption system or other methods to impart heat to the proppant mixture. The thermal desorption unit may be used to polymerize and coat an alpha-hydroxycarboxylic acid onto sand, to melt polyglycolic acid onto the proppant, or to flash solvent from a mixture of proppant and a polymer solution, each resulting in a proppant covered with polyglycolic acid or other alpha-hydroxycarboxylic acid polymers. The heat exchange system, such as the thermal desorption system, may drive off and condense any vapors generated during the coating process. In some embodiments, the heating chamber may be divided into independent heating zones for controlled heating and/or cooling of the proppant mixture. Heating may be by direct or indirect heat exchange, or combinations thereof. For example, electric heaters may indirectly transfer heat to the solids via conduction through the chamber shell. Solids may be transported through the heating chamber(s) via a screw conveyor or other appropriate mixing devices. The thermal desorption unit may be capable of treating solids to temperatures to more than 300° C. and liquid contents of up to 50 percent in level.

Figure 1:
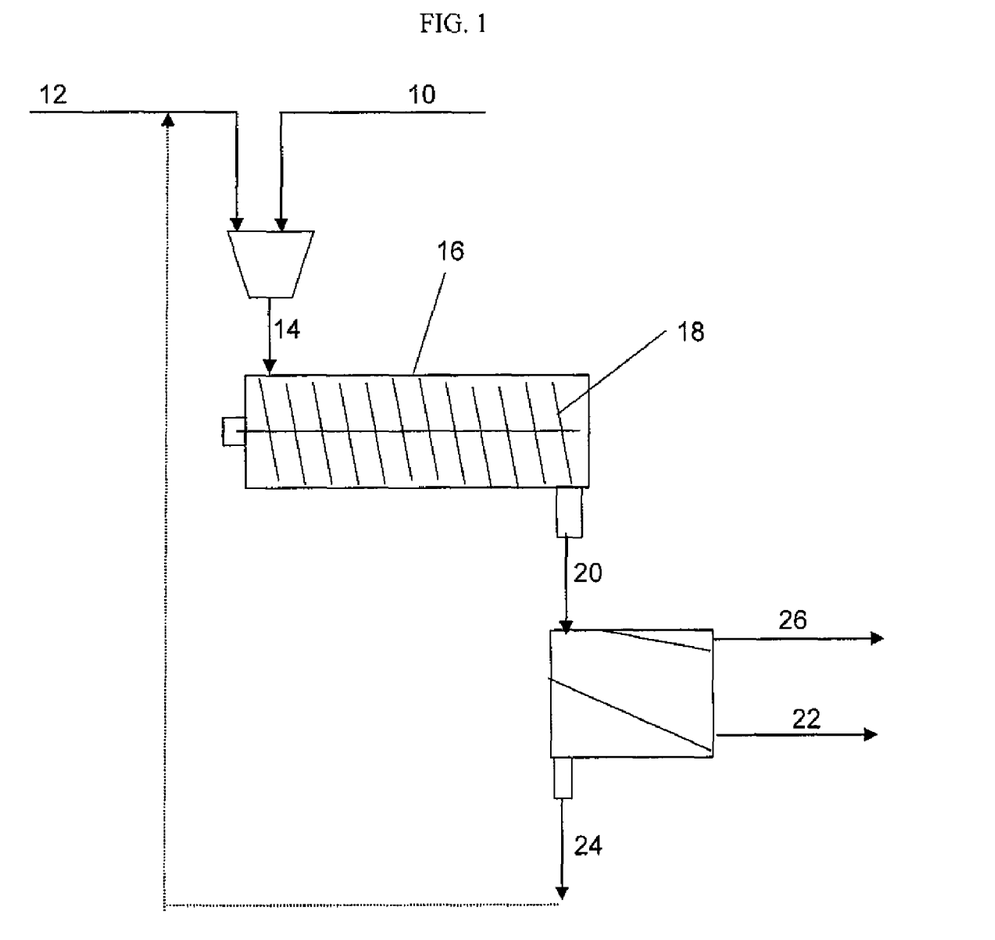
FIG. 1 is a simplified process flow diagram of one embodiment of the dry polymer coating process described herein.

Referring now to FIG. 1, one embodiment of a dry method for producing a poly(alpha-hydroxycarboxylic acid) coated proppant is illustrated. The process includes blending the sand 10 and a polymer 12 at a desired ratio. The blended material 14 may then be fed to a heat exchange system 16, such as the thermal desorption system described above. The mixture may be forwarded through the heat exchanger using a mixer 18, such as a screw conveyor. As the mixture passes through the heat exchanger, the poly(alpha-hydroxycarboxylic acid) may melt, associating with or coating the proppant. Upon cooling, the polymer may remain associated with the proppant. The polymer/proppant mixture 20 may then be separated into polymer coated proppant 22, unassociated polymer 24, and any agglomerates 26 that may have formed. The unassociated polymer 24 may optionally be recycled to the beginning of the process, if desired.

For example, the process may start with blending the sand and coating agent (polymer) in the appropriate ratios or directly feeding the materials to the heat exchange system so as to result in coating 2 to 20 weight percent poly(hydroxylacetic acid) on the sand. In other embodiments, the sand and coating may be at a ratio of from 5 to 15 weight percent polymer; and from 8 to 13 weight percent in yet other embodiments. This blended material may then be passed through a thermal desorption unit, passing through the heating zones, which may be set to different temperatures. The temperature of the zones may vary depending upon the polymer type and the rate at which the blend is being processed. The blend of sand and coating agent may be transported through the unit via a screw conveyor, for example. Upon exiting the thermal desorption unit (heat exchanger), the sand may be passed over a shale shaker with 10 to 40 mesh screens, separating agglomerates, coated sand, and unassociated coating agent. The unassociated coating agent may then be recycled on subsequent batches or passes.

Figure 2:
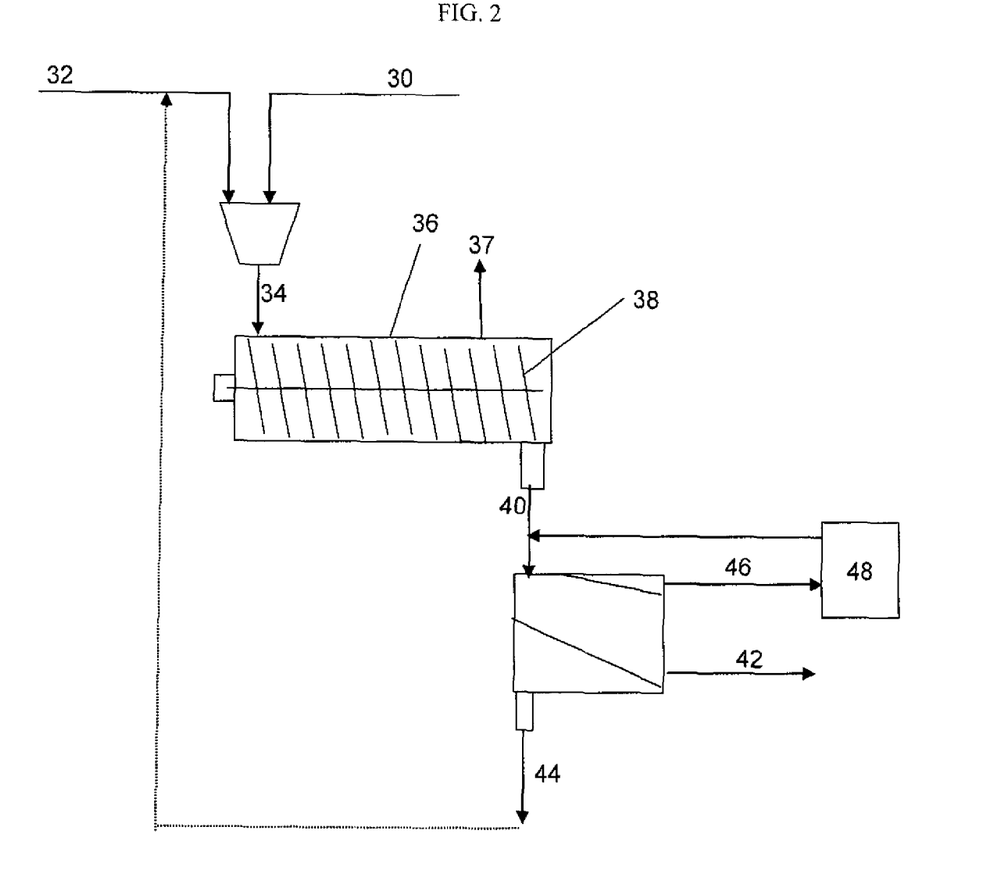
FIG. 2 is a simplified process flow diagram of one embodiment of the wet coating process described herein.

Referring now to FIG. 2, one embodiment of the wet process to form a polymer coated proppant is illustrated. The process begins by blending or pre-blending the proppant 30 and a monomeric alpha-hydroxycarboxylic acid solution 32. The monomer-proppant mixture 34 may then be passed through a reactor 36, such as the thermal processing unit described above, forming a polymeric coating and flashing off any solvents 37 or byproducts of the reaction process, including water, completing the coating process. The mixer 38 used during the reaction process may hinder the formation of agglomerates during the process. The polymer/coated proppant mixture 40 may then be discharged and separated as described above for FIG. 1, recovering coated proppant 42, unassociated polymer 44, and agglomerates 46. The recovered agglomerates 46 may be processed through a deagglomerator 48 for additional separations if needed.

In certain embodiments, the pre-blended proppant and monomer may consist of a concentrated monomeric solution, such as a glycolic acid/water solution, where the glycolic acid may be at a concentration of greater than 70 weight percent. In other embodiments, the glycolic acid may be at a concentration greater than 80 weight percent; greater than 85 weight percent in other embodiments; and greater than 87 weight percent in yet other embodiments.

In certain embodiments, the concentrated monomer and proppant mixture may form a "cookie dough" like consistency due to the viscosity of the monomer at high concentrations, such as greater than 80 weight percent. During initial processing, the viscosity of the monomer may decrease due to added temperature as the mixture is heated and reacted, and adequate mixing may be required to maintain the monomer and proppant in intimate contact so as to form the desired coating of polymer on the proppant.

In certain embodiments, the reactor temperature zones may be in the range of 65-121° C. (150-250° F.) A screw conveyor may transport the material through the reactor, maintaining intimate contact between the monomer/polymer and the proppant, and keeping large agglomerates from forming. As the material is discharged from the reactor, it may be passed over a shaker equipped with 10 and 40 mesh screens to separate the polymer coated proppant, unassociated polymer, and agglomerates, for example.

The above described wet method may result in a coating of 5-20 percent by weight polymer on the proppant, similar to the dry process described above. In the wet processed material, the sand grains can become agglomerated, requiring some extra processing to disaggregate the sand grains. For example, the aggregates may be sieved to remove any particles larger than 8 mesh. Depending upon the desired size of the coated proppant, any size screen may be used to separate the polymer coated proppant, the unassociated polymer, and any agglomerates. These large particles may contribute to tool plugging or the formation of a more porous than expected gravel filter in the annulus, which could contribute to diminished sand control.

In some embodiments, a polyglycolic acid-coated sand may be produced by heating a glycolic acid monomer, such as a 70 weight percent technical grade glycolic acid solution, with a natural or synthetic proppant, such as 20-40 mesh commercial sand, at temperatures of about 99° C. (210° F.) or higher until the sand-glycolic acid mixture turns lightly brown, or when the moisture content of the mixture is reduced to less than 5 percent by weight of dry sand.

Alternatively, the glycolic acid monomer can be pre-heated at a temperature of at least 99° C. (210° F.) until polymerization has started. While maintaining the polyglycolic acid in a liquid form at the above temperature, the proppant can be slowly added and constantly stirred until the ratio of the polyglycolic acid to the proppant is in the range of about 5 to about 20 percent per dry weight of the proppant; in the range of about 8 percent to about 12 percent in other embodiments.

Figure 3:
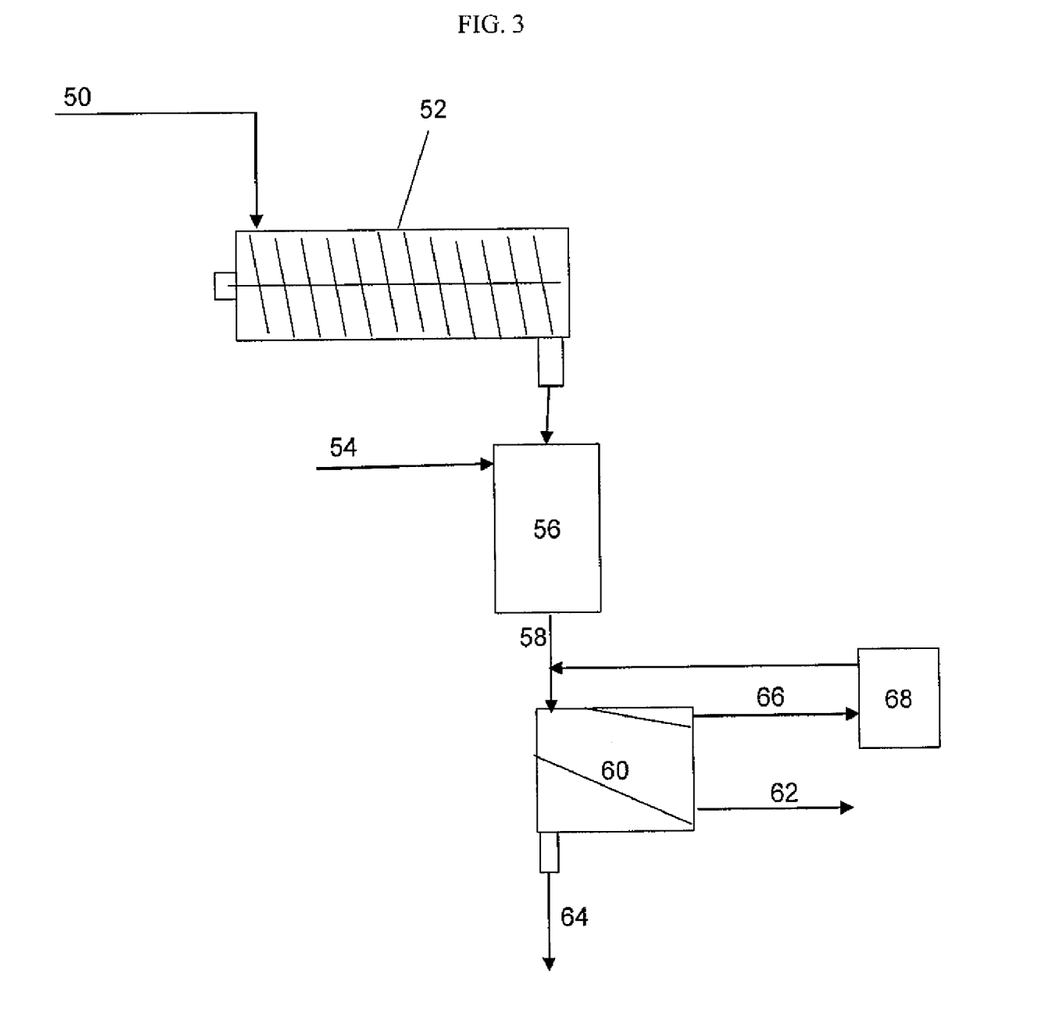
FIG. 3 is a simplified process flow diagram of another embodiment of the wet coating process described herein.

Referring now to FIG. 3, another embodiment of the wet process may include pre-heating the sand 50 in the thermal desorption unit or other heat exchange equipment 52 to a sufficient temperature. The monomer solution 54 may then be sprayed onto the sand, reacting to form polymer, forming a coating on the sand grains.

For example, the sand may be heated to a temperature from about 100° C. to about 300° C. (212° F. to 572° F.). Upon discharge from the heater, the sand may pass through a coating shower, covering the sand with monomer. Due to the heat of the sand, the monomer may react to form a polymer coating on the sand. Upon exiting the shower 56, the coated material 58 may be sieved with a shaker 60, recovering coated particles 62, unassociated polymer 64, and large agglomerates 66. Optionally, large agglomerates 66 may be processed through a de-agglomerator 68 and resieved.

In other embodiments, one or more poly(alpha-hydroxycarboxylic acids) may be deposited on the surface of the proppant by any appropriate means. In one embodiment of the coating method, the proppant may be suspended in an upward flow of gas to form a fluidized bed. A fine spray of a solution of polymer may be introduced to the fluidized bed, fine droplets of the solution being received on the surfaces of the proppants to coat the particles and the solvent being evaporated from the beads by continued flow of the fluidizing gas.

Alternatively, the polymers may be applied from solution, for example, by preparing a solution of a polymer or polymers in an appropriate solvent such as methylene chloride. The proppant particles may be contacted with the solution, and may be withdrawn from the polymer solution after a few seconds. After removal from the solution, the particles may be placed on a screen or other suitable support enabling the proppants to remain separate from one another. Use of a screen made of a wire or a polymer meshwork enables the proppant particles to be supported in separate mesh openings to prevent agglomeration. The coated particles may be air dried with moisture-free air.

In yet another embodiment, a coating procedure uses a rotary drum, such as a tilted drum. The proppant particles may be tumbled within the drum while a coating formulation of monomeric or polymeric solution is sprayed onto the agitated proppant particles. Indirect or direct heating may be used, reacting monomer or evaporating the solvent, as appropriate, resulting in the desired polymer coated proppant. In any of the aforementioned methods to coat a proppant with a poly(alpha-hydroxycarboxylic acid), the proppant may be passed through the process one or more times, forming a single or multiple polymer coating layers on the proppant.

The polymer coated proppants formed from the methods described above may be used in gravel pack operations, fracture sand, fracture packing, pre-packed screens and other down hole operations where an acid treatment is desirable.

When a completed well is ready for gravel pack operation, the polymeric alpha-hydroxycarboxylic acid-coated proppant may be added to the gravel pack fluid and pumped downhole to fill the annular space between the production screen and formation in place of the typical gravel pack sand. The gravel pack fluid may include water and brines containing various electrolytes and their blends, such as but not limited to NaCl, KCl, $CaCl_2$, $CaBr_2$, $ZnBr_2$, etc.

Under downhole conditions, the polymeric alpha-hydroxycarboxylic acid coating generates acidic by-products that may react with the acid-soluble and acid-breakable components in the filter cake. The slow release rate of the acidic by-product may require that the well be shut in for a given period of time to complete the dissolution and break-down reaction. In various embodiments, the polymeric alpha-hydroxycarboxylic acid coated sand disclosed herein may be used to break monovalent salt based systems, such as FLOPRO® NT, divalent salt based systems, such as DIPRO™, and reversible oil based mud filter cakes, such as FAZEPRO™, all of which are commercially available from M-I, L.L.C. (Houston, Tex.).

Examples are given below to illustrate the procedures that can be used to prepare polymeric alpha-hydroxycarboxylic acid coated sand. However, it should be noted that the production of the coated sand is not limited to the procedures used by the examples.

The following examples are included to demonstrate embodiments of the invention. It should be appreciated by those of skill in the art that the techniques and compositions disclosed in the examples which follow represent techniques discovered to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

General Information Relevant to the Examples: To evaluate the effects of the polyglycolic-acid-coated sand on filter cake clean up, the test procedure below was used. The test equipment and materials used are considered typical for those who are skilled in the art.

1. A reservoir drilling fluid was first prepared using a given fluid formulation that had been previously selected for a possible field well drilling application.

2. A filter cake was built on a water-saturated ceramic disk having an average 5-micron pore opening size in a double-ended high temperature high pressure fluid loss cell by pressing the reservoir drilling fluid against the ceramic disk with about 300 psi nitrogen differential pressure at about 60-82° C. (140° F.-180° F.) for approximately 16 hours.

3. After the filter cake had been built, the reservoir drilling fluid inside the cell was decanted and the inside of the cell was rinsed with water to remove the remaining fluid residues.

4. The cell was filled with about 70 mls of a brine to be used for gravel packing. The testing breaker, e.g., the polyglycolic-acid-coated sand or a blend of uncoated gravel pack sand with a chemical breaker, was slowly poured into the brine. No stirring or mixing was performed when adding the breaker.

5. The cell was reassembled, pressurized, and heated to desired temperature to soak the filter cake along with the breaker and gravel pack sand. The drainage valve at the bottom of the cell could be either closed or open depending on the purpose of testing.

6. With the bottom drainage valve open, the soaking brine could flow through the disk as soon as the breaker had reacted with the filter cake and created a communication channel through the filter cake. The time required for this to happen was monitored and measured.

7. With the bottom drainage valve closed, the cell was said to be in a shut-in condition and the soaking brine was not allowed to flow out until a pre-determined soaking time has been reached. The rate at which the brine was drained was monitored to evaluate the efficiency of filter cake clean up.

After the soaking test, the condition of the filter cake inside the cell, such as the amount of residue left on the disk, was visually examined. Permeability of the ceramic disk before or after the soaking also could be measured to evaluate the effectiveness of the removal of filter cake.

Example 1

A batch of polyglycolic acid coated sand was prepared using the following ingredients and procedures:

1. A mixture consisting of 380 grams of 20-40 mesh industrial quartz sand from Unimin Corporation and 190 grams of technical grade, 65-70 weight percent glycolic acid solution from J. T. Baker was mixed together in a 2-liter crystallizing dish.

2. The dish was placed on a hot plate and heated under a ventilated hood. A temperature of at least 99-104° C. (210-220° F.) was obtained and maintained for about 8-10 hours.

3. The mixture was stirred frequently until the mixture turned into a light-brown colored, somewhat viscous and sticky mixture.

4. When the color of the final mixture changed to light-brown, the heating was terminated.

5. The mixture was cooled to room temperature while stirring. Large aggregates formed during cooling were broken up into individual grains using mortar and pestle.

6. The loose polyglycolic-acid-coated sand grains were sieved through a 60-mesh screen to remove fine-grained, uncoated polyglycolic acid. The sieved polyglycolic-acid-coated sand was used for the filter cake clean up test.

Based on mass balance, the sieved polyglycolic-acid-coated sand contains approximately 13 percent by weight of polyglycolic acid per dry weight of sand. Although the industrial sand used has a 20-40 mesh size, other sizes of industrial sand can also be used to prepare the polyglycolic-acid-coated sand.

Example 2

Using the polyglycolic-acid-coated sand that was previously prepared with the method described in Example 1, and the test procedures described above, the filter cake removal efficiency of the polyglycolic-acid-coated sand was evaluated.

In one test, with the bottom drainage valve left open during soaking, the polyglycolic-acid-coated sand created some pinholes through the filter cake. However, when the valve was left shut-in for 31.5 hours, the filter cake was almost completely destroyed at the end of the soaking with the polyglycolic-acid-coated sand. Return permeability evaluation indicated that the ceramic disk was not severely damaged in terms of fluid conductivity. The test results are given in the following table (Table 1).

TABLE 1

Results of evaluation of polyglycolic-acid-coated sand as a breaker to remove filter cake deposited from a 13.0 ppg $CaBr_2$ based reservoir drilling fluid. The polyglycolic acid content was about 21%.

| Type of Mud to build cake | Breaker | Soaking Time & Temperature | Filter Cake after Soaking | Return Permeability |
|---|---|---|---|---|
| 13 ppg $CaBR_2$ based | approx. 22 g PGA coated | 4.5 hrs at 180 F. w/Valve | Mostly intact with | n/a |

Return Permeability is the average initial permeability of 5-micron disk is about 800 md.

Example 3

A series of tests were conducted to illustrate the effects of temperature on the filter cake clean up capability of the polyglycolic-acid-coated sand. Filter cakes were built at specific temperatures and then soaked with the polyglycolic-acid-coated sand at the same specific temperatures. The valves were closed during the soaking except at 48 and 72 hours of testing when the valves were opened to drain the soaking brine.

After 48 hours of soaking, none of the cells was able to drain the soaking brine, indicating no effective communication was established through the filter cake. After 72 hours of soaking, the soaking brine was effectively drained; however, there was a difference in the draining rate. Examination of the ceramic disks recovered after the test showed varying amounts of filter cake residues left on the disks, which seems to indicate that the effectiveness of the clean up by polyglycolic-acid-coated sand was temperature dependent. Thus, shut in time required for complete filter cake removal should be adjusted depending on the temperature. Test results are disclosed in Table 2 below.

TABLE 2

Results of evaluation of polyglycolic-acid-coated sand as a breaker to remove filter cake deposited from a 12.5 ppg $CaBr_2$ based reservoir drilling fluid. The polyglycolic acid content was about 13%.

| Type of Mud to build cake | Breaker | Soaking Time & Temperature | Filter Cake after Soaking |
|---|---|---|---|
| 12.5 ppg $CaBr_2$ based Reservoir drilling fluid | 20 grams PGA coated sand in 12.5 ppg $CaBr_2$ brine | 72 hrs at 140 F. with Valve Closed | approx. 50% destroyed |
| 12.5 ppg $CaBr_2$ based Reservoir drilling fluid | 20 grams PGA coated sand in 12.5 ppg $CaBr_2$ brine | 72 hrs at 160 F. with Valve Closed | approx. 90% destroyed |
| 12.5 ppg $CaBr_2$ based Reservoir drilling fluid | 20 grams PGA coated sand in 12.5 ppg $CaBr_2$ brine | 72 hrs at 180 F. with Valve Closed | greater than 90% destroyed |

Example 4

The following table (Table 3) illustrates the generation of acidic components from polyglycolic-acid-coated sand in various fluids as compared with un-coated sand placed in similar fluids, as indicated by pH measurement after each fluid was exposed to 60° C. (140° F.) for 4 days. The concentration of uncoated sand and polyglycolic-acid-coated sand was 10 percent by weight per volume of the fluid. The use of polyglycolic-acid-coated sand with divalent brines is more beneficial than with freshwater.

TABLE 3

Results of the generation of acidic components of polyglycolic-acid-coated sand in various fluids

| | Uncoated Sand (pH) | PGA - Coated Sand (pH) |
|---|---|---|
| Freshwater | 9.1 | 2.9 |
| 10 ppg NaCl Brine | 8.1 | 1.6 |
| 12.5 ppg NaCBr Brine | 8.3 | 1.6 |
| 11.6 ppg $CaBr_2$ Brine | 6.1 | less than 0.1 |
| 14.2 ppg $CaBr_2$ Brine | 4.8 | less than 0.1 |

Advantageously, embodiments disclosed herein may form individual coated particles. Additionally, embodiments disclosed herein may allow for the coating of a proppant with control of the amount of polymer coated on the product. Other embodiments may allow for the minimization of fines and or agglomerates that are undesired products that may hinder down hole operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. A process for making a coated substrate, comprising:
   treating a proppant with a coating agent, wherein the coating agent comprises at least one poly(alpha-hydroxycarboxylic acid);
   reacting the treated proppant to form a polymer coated proppant, wherein the reacting comprises heating the treated proppant above a melting temperature of at least one of the alpha-hydroxycarboxylic acid polymers, and binding a polymeric alpha-hydroxycarboxylic acid to the proppant; and
   recovering the polymer coated proppant.

2. The process of claim 1, wherein the coating agent further comprises a solvent.

3. The process of claim 2, wherein the reacting comprises removing the solvent from the treated proppant.

4. The process of claim 2, wherein the coating agent comprises 70 weight percent poly(alpha-hydroxycarboxylic acid) or more in water.

5. The process of claim 4, wherein the coating agent comprises 85 weight percent poly(alpha-hydroxycarboxylic acid) or more in water.

6. The process of claim 4, wherein the reacting comprises removing water from the treated proppant.

7. The process of claim 1, wherein the treating comprises applying the coating agent onto the proppant.

8. The process of claim 7, wherein the coating agent is a molten poly(alpha-hydroxycarboxylic acid).

9. The process of claim 1, wherein the reacting comprises forming unassociated polymer, the process further comprising recycling the unassociated polymer to the treating step.

10. The process of claim 1, further comprising:
    separating agglomerates from the polymer coated proppant;
    deagglomerating the agglomerates to form polymer coated proppant particles.

11. The process of claim 1, wherein the heating comprises direct heat exchange, indirect heat exchange, or a combination thereof.

12. The process of claim 1, wherein the poly(alpha-hydroxycarboxylic acid) is formed from one or more monomers selected from the group consisting of glycolic, malic, lactic, gluconic, citric, mandelic, saccharic, mucic, and tartaric acid and mixtures thereof.

13. The process of claim 1, wherein the proppant comprises natural or synthetic silica sand, glass beads, quartz, ceramics, thermoplastic resin, sintered bauxite, metal oxides, and combinations thereof.

14. The process of claim 1, wherein the polymer coated proppant comprises from about 2 percent to about 20 percent by weight poly(alpha-hydroxycarboxylic acid) per dry weight of the proppant.

* * * * *